United States Patent
Guo et al.

(10) Patent No.: US 11,813,764 B2
(45) Date of Patent: Nov. 14, 2023

(54) FIXED BLADE MONITORING STRUCTURE AND CUTTING DEVICE

(71) Applicant: CONTEMPORARY AMPEREX TECHNOLOGY CO., LIMITED, Ningde (CN)

(72) Inventors: Yitai Guo, Ningde (CN); Zhihua Wen, Ningde (CN); Keqiang Li, Ningde (CN); Cong Zhang, Ningde (CN); Yunru Shi, Ningde (CN); Jun Hu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/968,728

(22) Filed: Oct. 18, 2022

(65) Prior Publication Data

US 2023/0241795 A1 Aug. 3, 2023

Related U.S. Application Data

(63) Continuation of application No. PCT/CN2022/091556, filed on May 7, 2022.

(30) Foreign Application Priority Data

Jan. 28, 2022 (CN) .......................... 202220238758.9

(51) Int. Cl.
*B26D 5/00* (2006.01)
*B26D 7/26* (2006.01)
*H01M 4/04* (2006.01)

(52) U.S. Cl.
CPC ............ *B26D 5/00* (2013.01); *B26D 7/2628* (2013.01); *B26D 2007/2607* (2013.01); *H01M 4/04* (2013.01)

(58) Field of Classification Search
CPC ... Y10T 83/101; Y10T 83/148; Y10T 83/162; Y10T 83/175; Y10T 83/9309;
(Continued)

(56) References Cited

U.S. PATENT DOCUMENTS

| | | | | |
|---|---|---|---|---|
| 5,497,685 A | * | 3/1996 | Mohr | B26D 7/04 83/365 |
| 2006/0123969 A1 | * | 6/2006 | Fujita | B26D 7/025 83/697 |

(Continued)

FOREIGN PATENT DOCUMENTS

| | | |
|---|---|---|
| CN | 204844247 U | 12/2015 |
| CN | 206185974 U | 9/2017 |

(Continued)

OTHER PUBLICATIONS

Contemporary Amperex Technology Co., Limited, PCT/CN2022/091556, International Search Report and Written Opinion, dated Jul. 5, 2022, 15 pgs.

(Continued)

*Primary Examiner* — Phong H Nguyen
(74) *Attorney, Agent, or Firm* — XSENSUS LLP

(57) ABSTRACT

This application relates to a fixed blade monitoring structure and a cutting device used for lithium battery manufacturing. The fixed blade monitoring structure includes: an anvil, fixed blade die set, and a fixed blade monitoring assembly. A sliding sleeve is disposed on the anvil. The fixed blade die set includes a fixed blade holder and a fixed blade mounted on the fixed blade holder. An end of the fixed blade holder is slidably mounted in the sliding sleeve. The fixed blade monitoring assembly is mounted in the sliding sleeve and connected to the fixed blade holder, and configured to render status of the fixed blade by monitoring a relative force received by the fixed blade holder. Through the above structure, manpower and time consumption in the tuning process is reduced. The status monitoring of a first cutter and a second cutter can be implemented during the cutting.

8 Claims, 6 Drawing Sheets

(58) Field of Classification Search
CPC . Y10T 83/822; Y10T 83/8821; Y10T 83/825; B26D 5/00; B26D 7/2628; B26D 2007/2607; H01M 4/04
See application file for complete search history.

(56) References Cited

U.S. PATENT DOCUMENTS

| | | | | |
|---|---|---|---|---|
| 2007/0056378 A1* | 3/2007 | Ishii | ............ | G01L 9/0033 |
| | | | | 73/729.1 |
| 2009/0038144 A1* | 2/2009 | Teramoto | ............ | H01M 4/04 |
| | | | | 29/623.1 |
| 2019/0358709 A1* | 11/2019 | Chen | ............ | B23B 29/12 |

FOREIGN PATENT DOCUMENTS

| | | |
|---|---|---|
| CN | 206510116 U | 9/2017 |
| CN | 210475665 U | 5/2020 |
| CN | 211210611 U | 8/2020 |
| CN | 211507818 U | 9/2020 |
| CN | 211762069 U | 10/2020 |
| KR | 20100076530 A | 7/2010 |

OTHER PUBLICATIONS

Request for the Submission of an Opinion, KR10-2022-7032514, Nov. 16, 2022, 5 pgs.
Decision to Grant a Patent, KR10-2022-7032514, dated May 9, 2023, 6 pgs.
Notice of Granting Priority Right of Utility Model Patent Right CN202220238758.9, dated May 23, 2022, 1 pg.

\* cited by examiner

FIXED BLADE MONITORING STRUCTURE AND CUTTING DEVICE

CROSS-REFERENCE TO RELATED APPLICATIONS

This application is a continuation application of PCT Patent Application No. PCT/CN2022/091556, entitled "FIXED BLADE MONITORING STRUCTURE AND CUTTING DEVICE" filed on May 7, 2022, which claims priority to Chinese Patent Application No. CN 202220238758.9, filed with the State Intellectual Property Office of the People's Republic of China on Jan. 28, 2022, and entitled "FIXED BLADE MONITORING STRUCTURE AND CUTTING DEVICE", all of which are incorporated herein by reference in their entirety.

TECHNICAL FIELD

This application relates to the technical field of lithium battery manufacturing, and in particular, to a fixed blade monitoring structure and a cutting device containing the fixed blade monitoring structure.

BACKGROUND

Due to high requirements imposed by a battery electrode plate on the quality of cutting, a cutting device of the electrode plate needs to be adjusted at the cost of a lot of manpower in an assembling process. Atrial cut test of the cutting device needs to be performed by using the electrode plate in such a process. Data about the service life of a blade during operation is not suitable for being fed back because the manufacturing and assembling processes of the blade vary. The operating status of the blade has to be determined by sampling the electrode plate, thereby affecting production efficiency of the cutting procedure.

SUMMARY

An objective of this application is to provide a fixed blade monitoring structure and a cutting device to implement parameterized assembling and tuning of the cutting device, reduce manpower consumption, and shorten the mounting and tuning period.

According to a first aspect, this application provides a fixed blade monitoring structure, including: an anvil, where a sliding sleeve is disposed on the anvil; a fixed blade die set, including a fixed blade holder and a fixed blade mounted on the fixed blade holder, where the fixed blade holder is slidably mounted in the sliding sleeve; and a fixed blade monitoring assembly, mounted in the sliding sleeve and connected to the fixed blade holder, and configured to render status of the fixed blade by monitoring a relative force received by the fixed blade holder.

In the technical solution of embodiments of this application, during the operation of the cutting device, a relative force exists between the fixed blade and movable blade. The fixed blade and the movable blade are arranged in an up-and-down staggered manner. The fixed blade die set is driven to slide in the sliding sleeve due to the relative force. By disposing the fixed blade monitoring assembly at a joint between the fixed blade holder and the anvil, the status of the fixed blade holder can be monitored. The status of the fixed blade holder derives from the fixed blade disposed on the fixed blade holder. That is, the fixed blade monitoring assembly can implement monitoring of the status of the fixed blade. The status of the fixed blade can be used as a reference to implement parameterized assembling and tuning of the cutting device, thereby reducing the manpower consumption in the tuning process and shortening the mounting and tuning period. In addition, with the increase of the operation time of the cutting device, wear occurs between the fixed blade and the movable blade, and reduces the relative force between the fixed blade and the movable blade. The reduction of the relative force can be rendered in time by the readout of a pressure gauge. In this way, the status of the cutter is fed back in time to facilitate timely adjustment.

In some embodiments, the fixed blade monitoring assembly includes a pressure sensor, one end of the pressure sensor abuts on a flank of the sliding sleeve, and the other end abuts on the fixed blade holder. The pressure sensor disposed not only enables numerical monitoring on the pressure, but also enables estimation and analysis of the blade status based on the change of the pressure value to implement the tracking of the blade status.

In some embodiments, the fixed blade monitoring assembly further includes an elastic adjustment portion. The elastic adjustment portion is disposed on an opposite side of the pressure sensor and is configured to elastically connect the fixed blade holder and the anvil, so as to adjust a position of the fixed blade holder in a horizontal direction of the sliding sleeve.

By disposing the elastic adjustment portion, the position of the fixed blade holder can be adjusted on the basis of ensuring the sliding ability of the fixed blade holder. On the one hand, this facilitates timely assembling and tuning. On the other hand, by adjusting the position of the fixed blade after the blade is worn down, the acting force between the fixed blade and the movable blade is kept within a specified range to maintain a good cutting state between the fixed blade and the movable blade.

In some embodiments, the elastic adjustment portion includes a connecting portion and an elastic piece. The connecting portion is parallel to a sliding direction. One end of the connecting portion is threadedly connected to an end of the fixed blade holder, and the other end is elastically connected to the anvil by the elastic piece.

By disposing the connecting portion and the elastic piece, the fixed blade holder is elastically connected to the anvil by using connecting portion and the elastic piece that are connected to each other. In this way, the position of the fixed blade holder is adjusted on the basis of ensuring the sliding ability of the fixed blade holder.

In some embodiments, the elastic piece is a compression spring or a compression disc spring. The compression spring or the compression disc spring sheathes the connecting portion, one end thereof abuts on the anvil, and the other end is connected to an end of the connecting portion. Through the compression spring or the compression disc spring, the elastic adjustment portion is elastically deformable to implement elastic adjustment.

In some embodiments, a first mounting hole in communication with the sliding sleeve is made on the anvil, and a second mounting hole is made at the end of the fixed blade holder. One end of the connecting portion passes through the first mounting hole and is threadedly connected to the second mounting hole. By disposing the first mounting hole and the second mounting hole that are in positional correspondence to each other, the connecting portion and the elastic piece are mounted in a corresponding manner. The structure is simple and easy to implement, and the connecting portion is caused to be located inside the anvil to reduce interference with other structures.

In some embodiments, the connecting portion is a bolt, and a head of the bolt abuts on the compression spring or the compression disc spring. By disposing the connecting portion as a bolt, the foregoing connection can be implemented more effectively by using the structure of the bolt, and the material is simple and easily available.

In some embodiments, the fixed blade monitoring structure further includes a controller and a display, and the controller is electrically connected to the pressure sensor and the display separately. By disposing the controller and the display, reading and displaying of data in the pressure sensor are implemented.

In some embodiments, a jack is disposed at an end of the fixed blade holder, and the jack is set in the sliding sleeve. The jack disposed at the end of the fixed blade holder reduces the dimensions of the anvil, and in turn, reduces the cost of manufacture.

According to a second aspect, this application provides a cutting device. The cutting device includes the fixed blade monitoring structure according to the foregoing embodiment.

The foregoing description is merely an overview of the technical solutions of this application. The following expounds specific embodiments of this application to enable a clearer understanding of the technical solutions of this application, enable implementation based on the content of the specification, and make the foregoing and other objectives, features, and advantages of this application more evident and comprehensible.

BRIEF DESCRIPTION OF DRAWINGS

By reading the following detailed description of exemplary embodiments, a person of ordinary skill in the art becomes clearly aware of various other advantages and benefits. The drawings are merely intended to illustrate the exemplary embodiments, but not intended to limit this application. In all the drawings, the same reference numeral represents the same component. In the drawings.

REFERENCE NUMERALS

Figure 1:
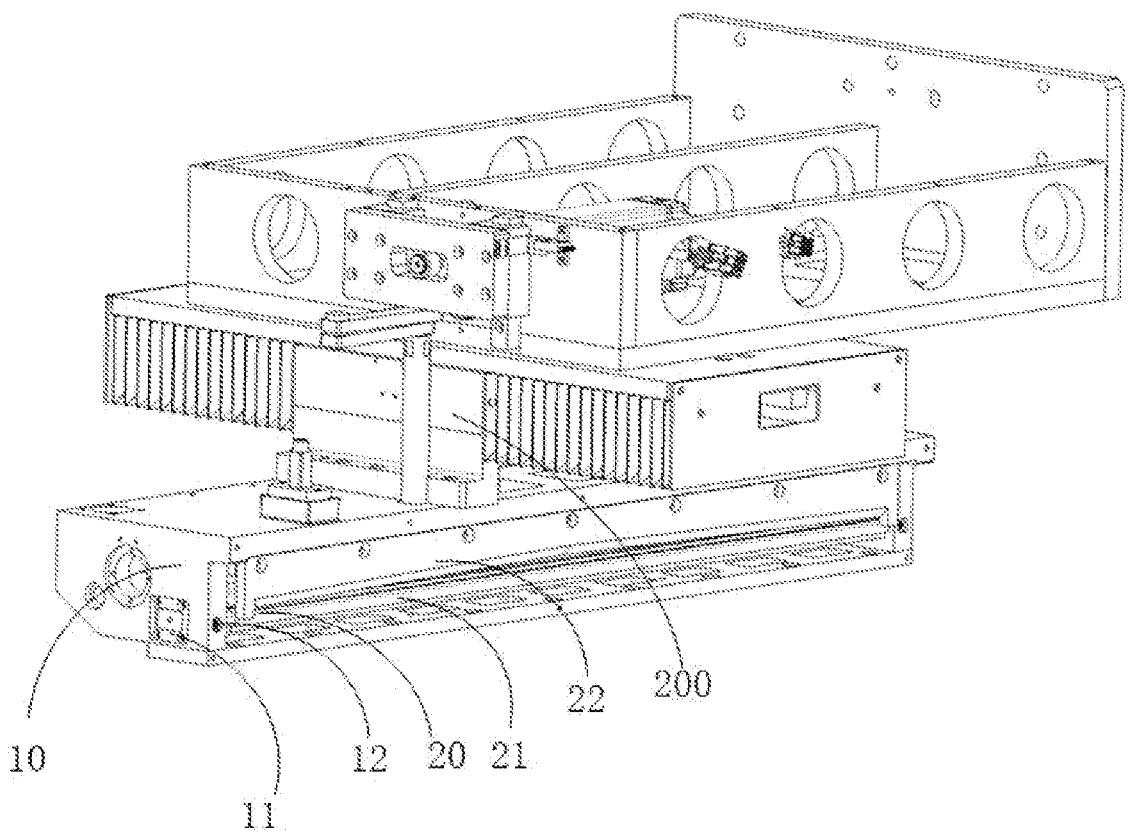
FIG. 1 is a schematic structural diagram of a combination of a fixed blade monitoring structure and a driving structure according to some embodiments of this application.

100—fixed blade monitoring structure; 200—driving structure; 10—anvil; 20— fixed blade die set; 30—pressure sensor; 11—sliding sleeve; 12—first mounting hole; 21— fixed blade; 22—movable blade; 23—fixed blade holder; 24—jack; 25—second mounting hole; 41—connecting portion; 42—elastic piece.

DETAILED DESCRIPTION OF EMBODIMENTS

Embodiments of the technical solutions of this application are described in detail below with reference to the drawings.

The following embodiments are merely intended to describe the technical solutions of this application more clearly, and are merely exemplary but without hereby limiting the protection scope of this application.

Unless otherwise defined, all technical and scientific terms used herein have the same meanings as usually understood by a person skilled in the technical field of this application. The terms used herein are merely intended for describing specific embodiments but are not intended to limit this application. The terms "include" and "contain" and any variations thereof used in the specification, claims, and brief description of drawings of this application are intended as non-exclusive inclusion.

In the description of the embodiments of this application, the technical terms "first" and "second" are merely intended to distinguish different objects but not intended to indicate or imply relative importance or implicitly specify the number of the indicated technical features, the specific order, or order of priority. In the description of the embodiments of this application, unless otherwise expressly specified, "a plurality of" means two or more.

Reference to "embodiment" herein means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

In the description of embodiments of this application, the term "and/or" merely indicates a relationship between related items, and represents three possible relationships. For example, "A and/or B" may represent the following three circumstances: A alone, both A and B, and B alone. In addition, the character "I" herein generally indicates an "or" relationship between the item preceding the character and the item following the character.

In the description of embodiments of this application, the term "a plurality of" means two or more (including two). Similarly, "a plurality of groups" means two or more groups (including two groups), and "a plurality of pieces" means two or more pieces (including two pieces).

In the description of embodiments of this application, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In the description of this application, unless otherwise expressly specified and qualified, the technical terms such as "mounting", "concatenation", "connection", and "fixing" need to be understood in a broad sense, for example, understood as a fixed connection or a detachable connection or understood as being integrated into a whole; or understood be as a mechanical connection or an electrical connection, a direct connection or an indirect connection implemented through an intermediary; or understood as interior communication between two components or interaction between two components. A person of ordinary skill in the art understands the specific meanings of the terms in the embodiments of this application according to the context.

As disclosed in the background section above, due to the high requirements of a battery electrode plate on the quality of cutting, the cutting device of the electrode plate needs to be adjusted at the cost of a lot of manpower during the assembling. A trial cut test of the cutting device needs to be performed by using the electrode plate in such a process. Specifically, the test includes the tuning of a horizontal displacement and a vertical displacement of a driving structure 200 in the cutting device, and the tuning of a relative position between the movable blade 22 and the fixed blade 21. The tuning aims to make the advancing movable blade 22 exactly fit in with the fixed blade 21 and cut off the electrode plate at a preset position. However, the foregoing parameterized assembling and tuning process lacks necessary references other than the electrode plate, and therefore, takes a lot of manpower, and incurs a relatively long period of mounting and tuning. In addition, with the increase of the operation time of the cutting device, the fixed blade 21 and the movable blade 22 are both worn down to some extent. Data about the service life of a blade is not suitable for being fed back because the manufacturing and assembling processes of the blade vary. The operating status of the blade has to be determined by sampling the electrode plate, thereby increasing a scrap rate of the electrode plate and affecting the production efficiency of the cutting procedure.

Figure 2:
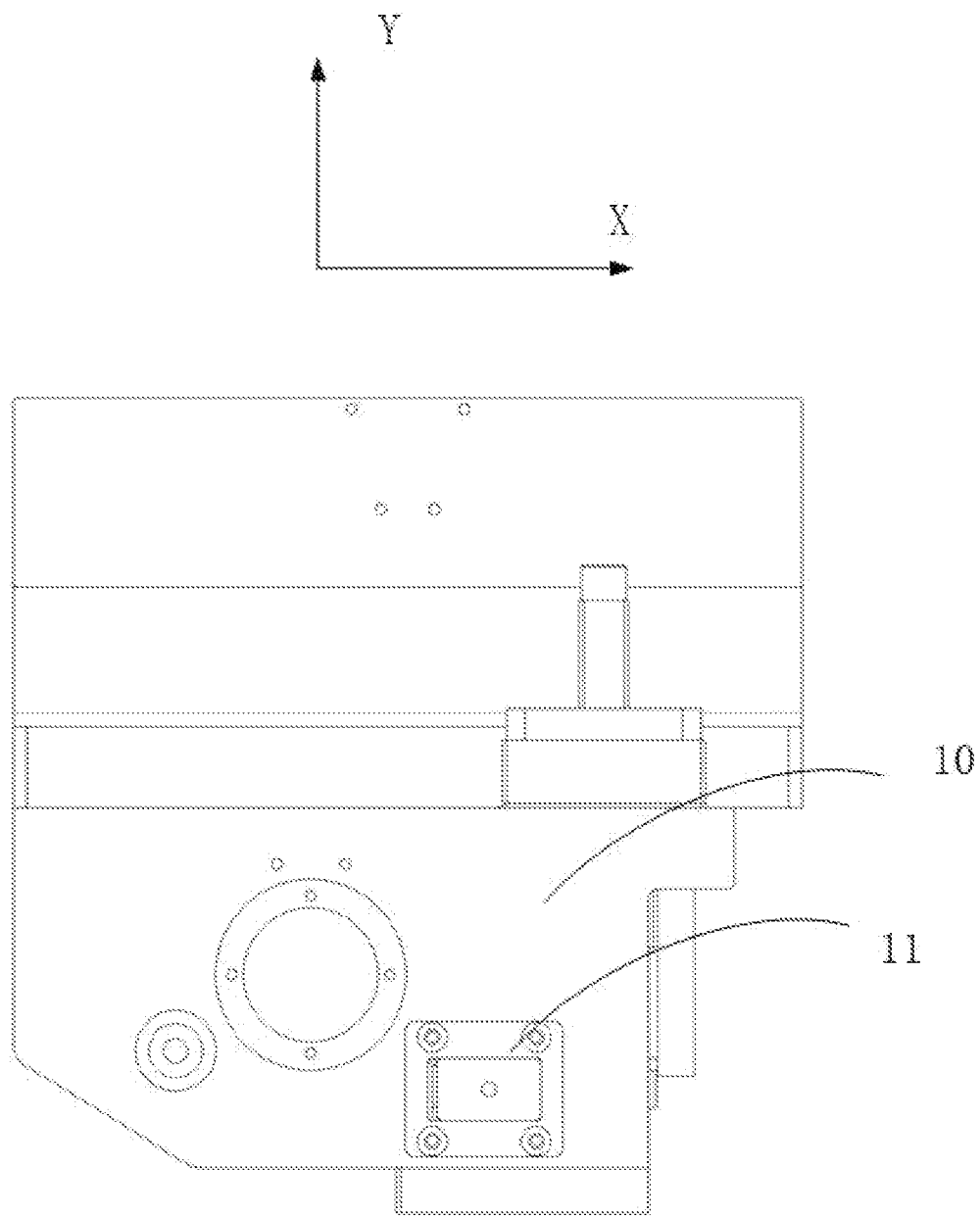
FIG. 2 is a schematic diagram of a partial structure shown FIG. 1.
Figure 3:
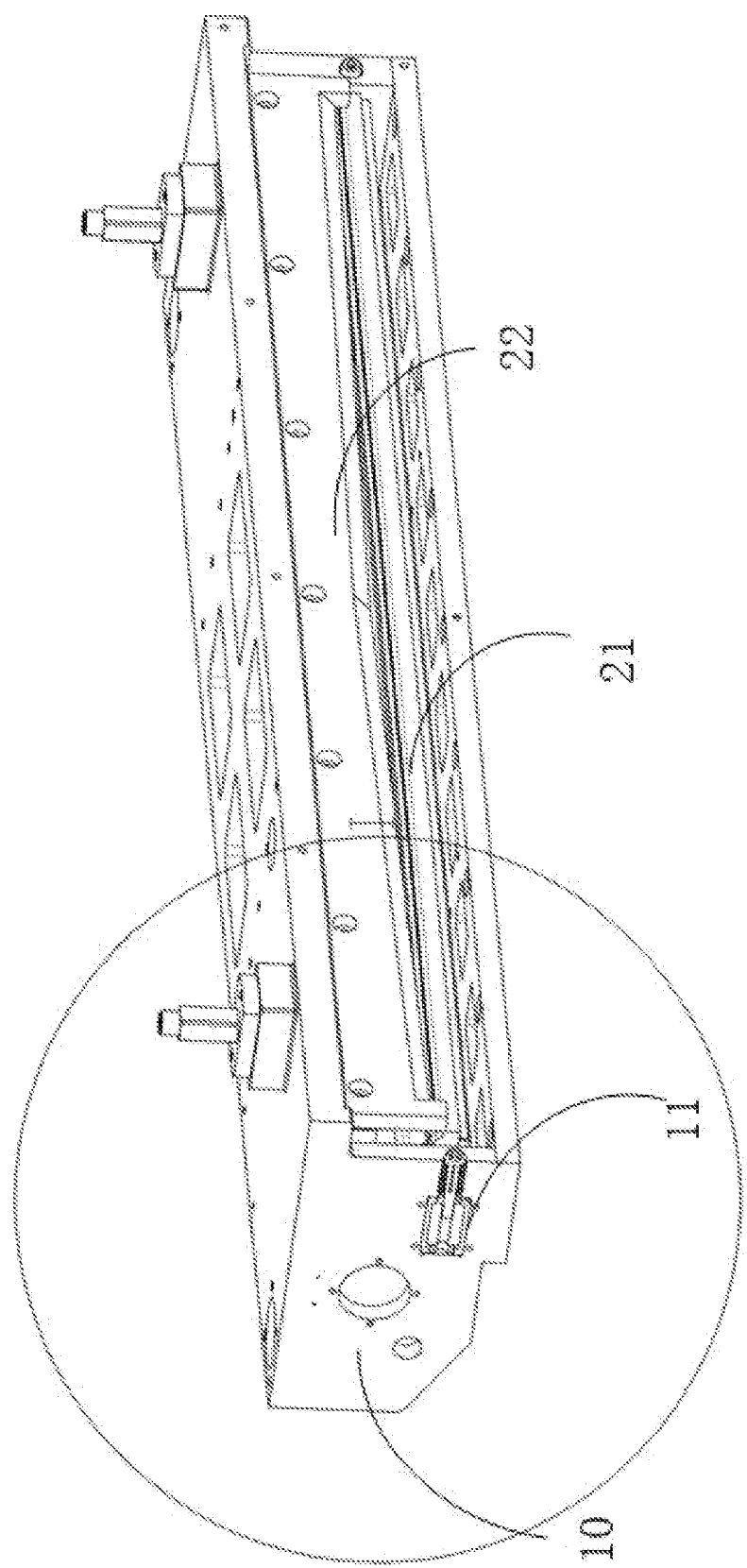
FIG. 3 is a schematic structural sectional view of FIG. 1 sectioned along a length direction of an mounting hole.
Figure 4:
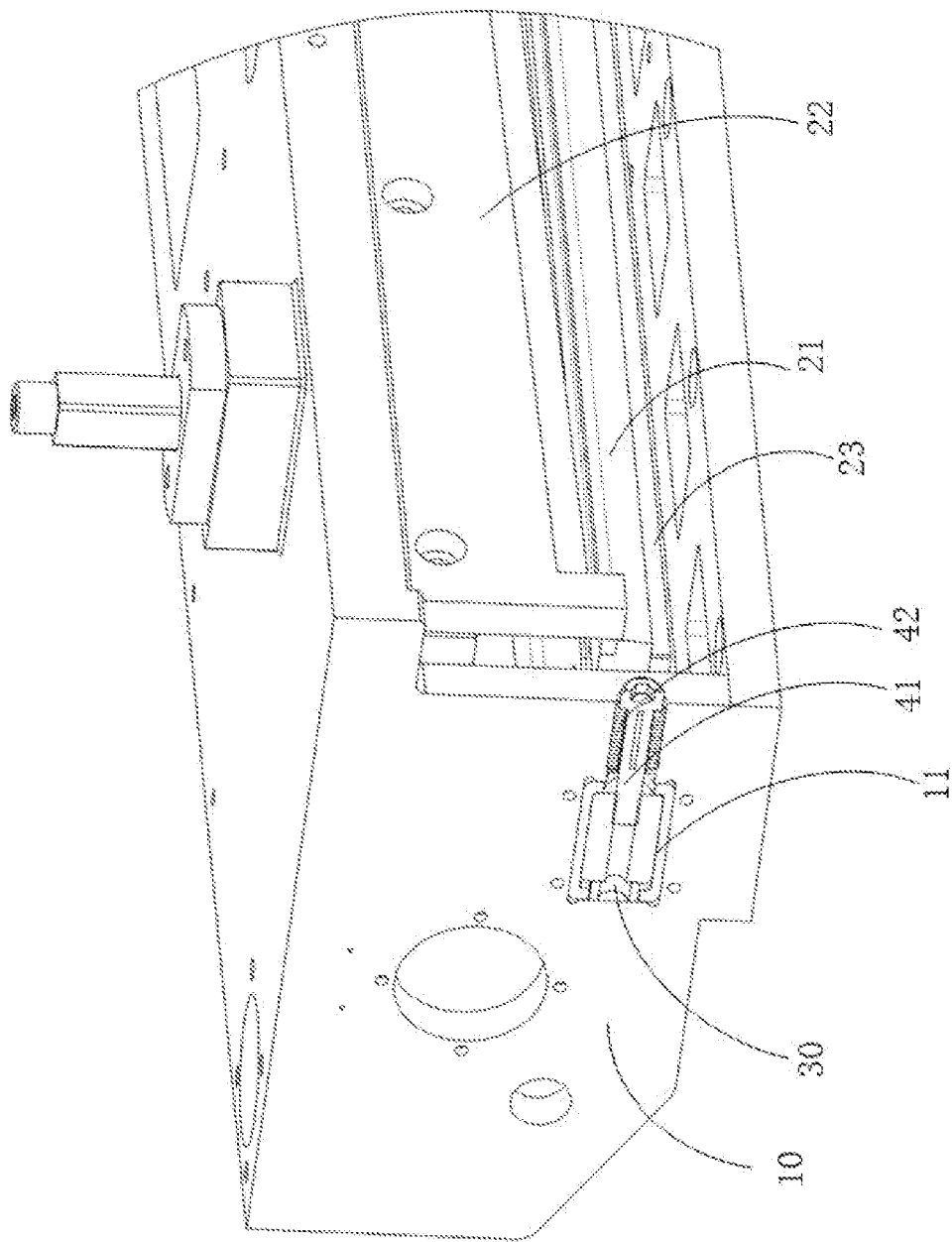
FIG. 4 is a close-up view of a partial structure shown in FIG. 3.
Figure 5:
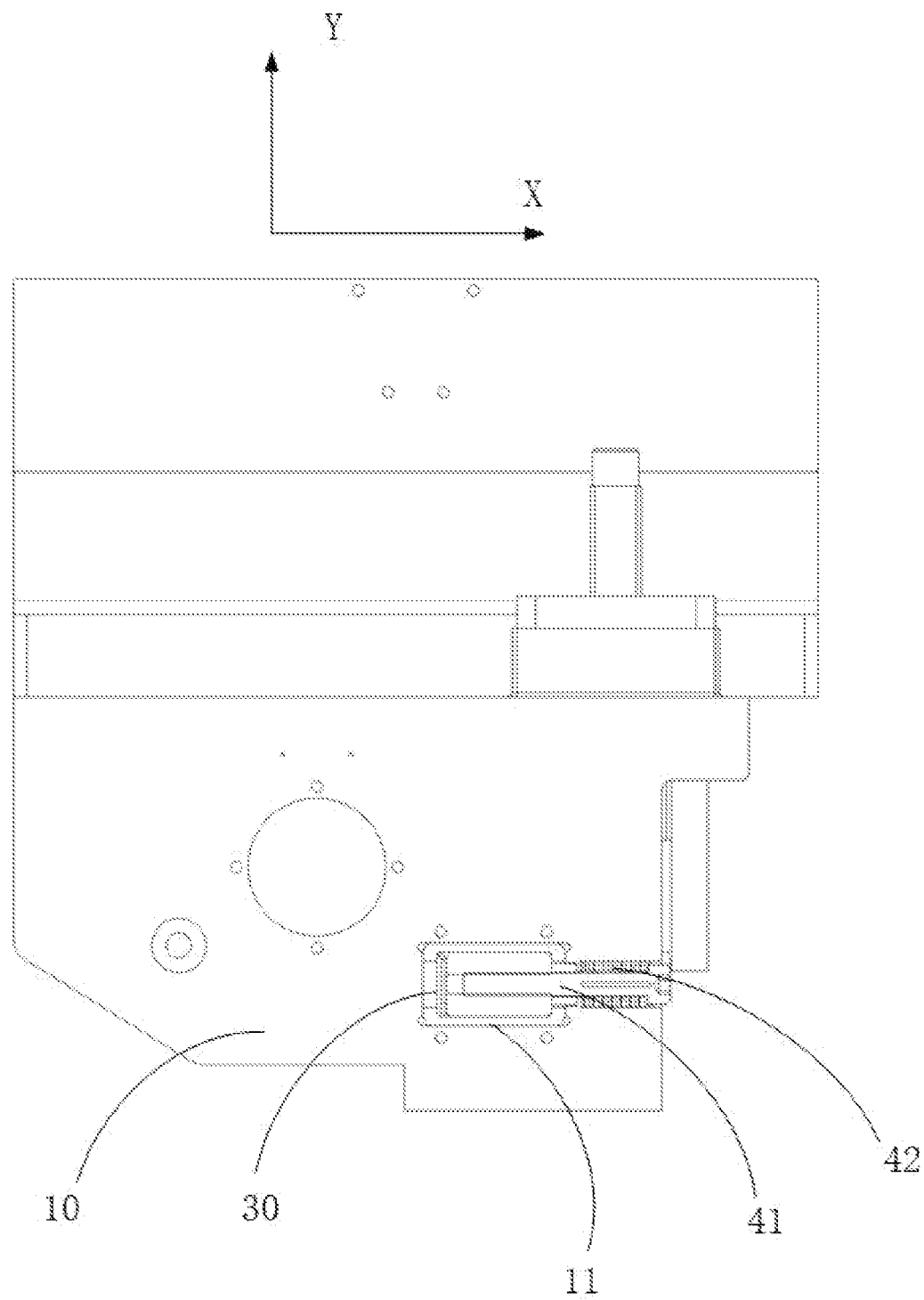
FIG. 5 is a schematic structural diagram of an elastic adjustment portion obtained by sectioning along a length direction of an mounting hole.
Figure 6:
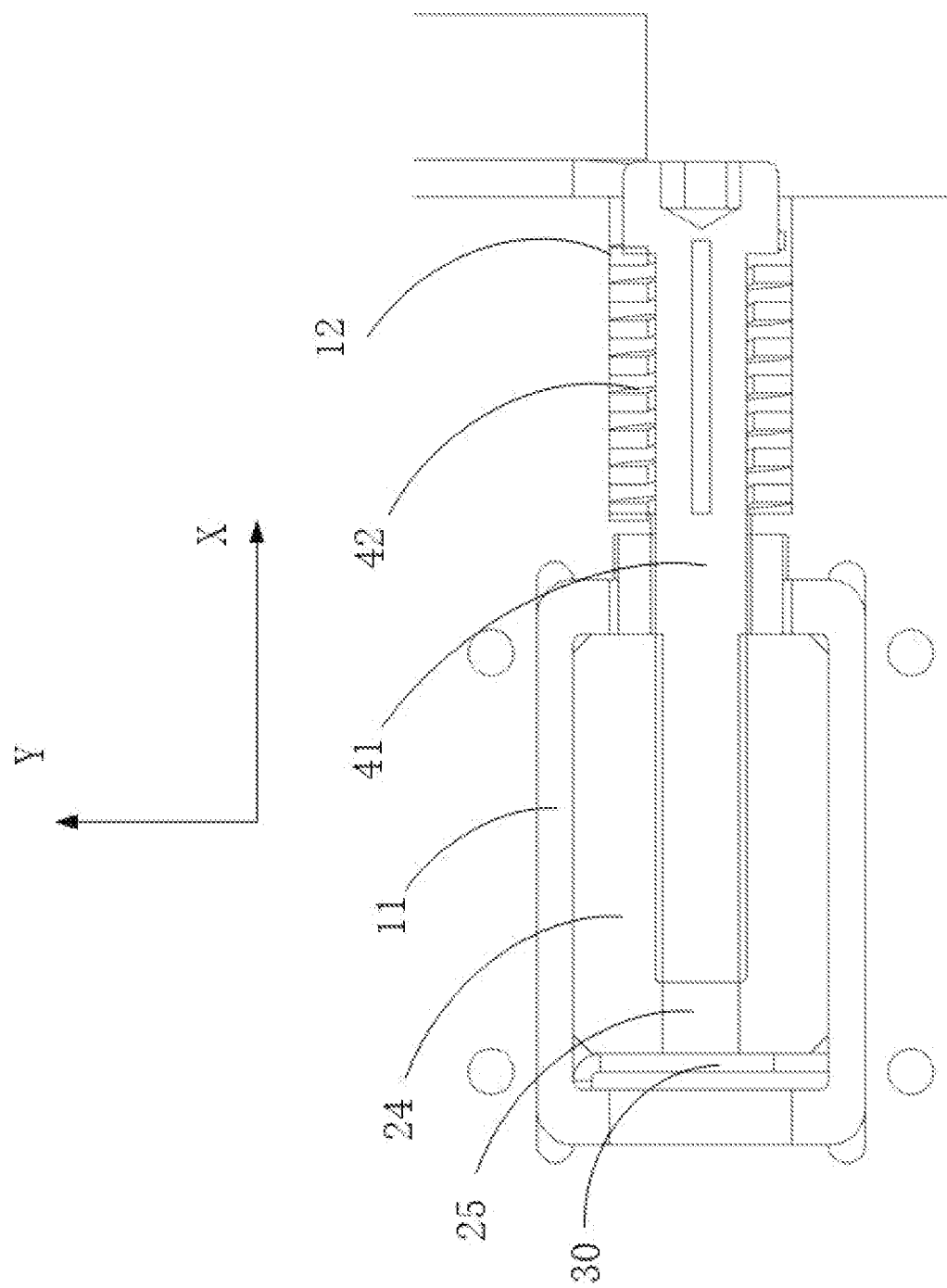
FIG. 6 is a further close-up view of a partial structure shown FIG. 3.

In view of the foregoing problems, as shown in FIG. 1 to FIG. 6, which illustratively shows an X direction as a horizontal direction and a Y direction as a vertical direction, some embodiments of this application provide a fixed blade monitoring structure 100 configured to monitor a fixed blade during cutting of a battery electrode plate. The fixed blade monitoring structure includes: an anvil 10, a fixed blade die set 20, and a fixed blade monitoring assembly. A sliding sleeve 11 is disposed on the anvil 10. The fixed blade die set 20 includes a fixed blade holder 23 and a fixed blade 21 mounted on the fixed blade holder 23. An end of the fixed blade holder 23 is slidably mounted in the sliding sleeve 11. The fixed blade monitoring assembly is mounted in the sliding sleeve 11 and connected to the fixed blade holder 23, and configured to render status of the fixed blade 21 by monitoring a relative force received by the end of the fixed blade holder 23.

The anvil 10 is a mounting structure, and is mounted on a horizontal driving assembly of a cutting structure, and specifically, mounted on a mover of the horizontal driving assembly, and is configured to make horizontal reciprocating movement along a travel direction of a web as driven by the horizontal driving assembly. The horizontal reciprocating movement drives a movable blade 22 and a fixed blade die set 20 on the anvil 10 to move horizontally synchronously.

The fixed blade die set 20 includes a fixed blade holder 23 and a fixed blade 21 mounted on the fixed blade holder 23. The fixed blade 21 and the movable blade 22 are in up-and-down correspondence and arranged in a staggered manner. The movable blade 22 is connected to the driving structure 200, and is configured to move downward as driven by the driving structure 200, so as to fit with the fixed blade 21 to cut off an electrode plate. Because the fixed blade and the movable blade are in up-and-down correspondence and arranged in a staggered manner, a relative force exists between the movable blade 22 and the fixed blade 21 to some extent during the cut-off operation, and in turn, a relative force is generated between the movable blade 22 and the fixed blade 21. The relative force exerted by the movable blade 22 on the fixed blade 21 can be transmitted to the fixed blade holder 23, so that a relative force exists between the end of the fixed blade holder 23 and the sliding sleeve 11.

The fixed blade monitoring assembly is disposed in the sliding sleeve 11 and connected to the end of the fixed blade holder 23, and is configured to obtain the relative force between the end of the fixed blade holder 23 and the sliding sleeve 11, and render the relative force in the form of data. The relative force between the end of the fixed blade holder 23 and the sliding sleeve 11 derives from the relative force between the fixed blade 21 and the movable blade 22. That is, the fixed blade monitoring assembly can render the relative force between the fixed blade 21 and the movable blade 22 during the cut-off operation in the form of data. The relative force rendered in the form of data is suitable for feeding back the status of the fixed blade 21 and the movable blade 22, and in turn, is suitable for serving as a reference for determining the status of the assembling and tuning of the cutting device, thereby implementing parameterized assembling and tuning of the cutting device, reducing manpower consumption, and shortening the period of mounting and tuning.

In addition, with the increase of the operation time of the cutting device, both the fixed blade 21 and the movable blade 22 are worn down to some extent. In this case, a distance between the fixed blade and the movable blade increases relatively, so that the relative force between them decreases relatively. The decreased relative force is rendered as a pressure value by the fixed blade monitoring assembly, and the pressure value also decreases relatively, so that the status of the fixed blade 21 is fed back in time to facilitate timely adjustment.

As shown in FIG. 3 to FIG. 6, in some embodiments of this application, the fixed blade monitoring assembly includes a pressure sensor 30. One end of the pressure sensor 30 abuts on a flank of the sliding sleeve 11, and the other end abuts on the end of the fixed blade holder 23.

The pressure sensor 30 is a precision component and can convert pressure into a readable and storable electrical signal. The pressure sensor 30 disposed not only enables numerical monitoring on the pressure, but also enables estimation and analysis of the blade status based on the change of the pressure value to implement the tracking of the blade status.

In some embodiments of this application, the fixed blade monitoring assembly further includes an elastic adjustment portion. The elastic adjustment portion is disposed on an opposite side of the pressure sensor 30 and is configured to elastically connect the fixed blade holder 23 and the anvil 10, so as to adjust a position of the fixed blade holder 23 in a horizontal direction of the sliding sleeve 11.

The elastic adjustment portion is an elastic structure, and is inherently elastically deformable to some extent in addition to being capable of displacement adjustment. The elastic adjustment portion is disposed on the opposite side of the pressure sensor 30 and is connected to the anvil 10 and the fixed blade holder 23 separately, and is configured to implement adjustable elastic connection between the anvil 10 and the fixed blade 21. This not only enables adjustment of the position of the end of the fixed blade holder 23 in the sliding sleeve 11, but also ensures that the end of the fixed blade holder 23 slides against the sliding sleeve 11 along the horizontal direction in the sliding sleeve 11.

By disposing the elastic adjustment portion, the position of the fixed blade 21 can be adjusted in time. On the one hand, this facilitates timely assembling and tuning. On the other hand, by adjusting the position of the fixed blade 21 after the blade is worn down, the acting force between the fixed blade 21 and the movable blade 22 is kept within a specified range to maintain a good cutting state between the fixed blade 21 and the movable blade 22.

In some embodiments of this application, the elastic adjustment portion includes a connecting portion and an elastic piece 42. The connecting portion is parallel to a sliding direction. One end of the connecting portion is threadedly connected to an end of the fixed blade holder 23, and the other end is elastically connected to the anvil 10 by the elastic piece 42.

The elastic piece 42 may be a compression elastic piece or a tensile elastic piece. The connection portion is threadedly connected to the end of the fixed blade holder 23, and the threaded connection length affects the length of the connection portion. The elastic piece 42 combined with the connecting portion makes the distance between the fixed blade holder 23 and the anvil 10 adjustable through the connection length of the connecting portion. The relative sliding of the end of the fixed blade holder 23 can be implemented by the elastic piece 42.

By disposing the connecting portion and the elastic piece 42, the fixed blade holder 23 is elastically connected to the anvil 10 by using connecting portion and the elastic piece 42 that are connected to each other. In this way, the position of the fixed blade holder 23 is adjusted on the basis of ensuring the sliding ability of the fixed blade holder 23.

In some embodiments of this application, the elastic piece 42 is a compression spring or a compression disc spring. The compression spring or the compression disc spring sheathes the connecting portion, one end thereof abuts on the anvil 10, and the other end is connected to an end of the connecting portion.

Through the compression spring or the compression disc spring, the elastic adjustment portion is elastically deformable to implement elastic adjustment.

Referring to FIG. 1 to FIG. 6, in some embodiments of this application, a first mounting hole 12 in communication with the sliding sleeve 11 is made on the anvil 10, and a second mounting hole 25 is made at the end of the fixed blade holder 23. One end of the connecting portion passes through the first mounting hole 12 and is threadedly connected to the second mounting hole 25.

The first mounting hole 12 is a through-hole, and is configured to implement communication between the sliding sleeve 11 and an outer wall of the anvil 10. The first mounting hole 12 is tucked inward at an inner wall of the sliding sleeve 11 to form an annular boss suitable for abutting on the elastic piece 42. The second mounting hole 25 is coaxial with the first mounting hole 12, and is configured to enable the connecting portion to be threadedly connected to the second mounting hole 25 after the connecting portion passes through the first mounting hole 12.

By disposing the first mounting hole 12 and the second mounting hole 25 that are in positional correspondence to each other, the connecting portion and the elastic piece 42 are mounted in a corresponding manner. The structure is simple and easy to implement, and the connecting portion is caused to be located inside the anvil 10 to reduce interference with other structures.

In some embodiments of this application, the connecting portion is a bolt 41, and a head of the bolt 41 abuts on the compression spring or the compression disc spring.

The bolt 41 includes a rod and a head. The rod is configured to be threadedly connected to the end of the fixed blade holder 23, and the head is configured to abut on the compression spring or the compression disc spring. By disposing the connecting portion as a bolt 41, the foregoing connection can be implemented more effectively by using the structure of the bolt 41, and the material is simple and easily available.

In some embodiments of this application, the fixed blade monitoring structure further includes a controller and a display, and the controller is electrically connected to the pressure sensor 30 and the display separately.

The controller and the display can be used together with the pressure sensor 30 to acquire and process electrical signals in the pressure sensor 30 and display the electrical signals on the display. By disposing the controller and the display, reading and displaying of data in the pressure sensor 30 are implemented.

In some embodiments of this application, a jack 24 is disposed at an end of the fixed blade holder 23, and the jack 24 is set in the sliding sleeve 11.

Compared with the fixed blade holder 23, the jack 24 is relatively small in size, and therefore, the required size of the sliding sleeve 11 is also relatively small. In this way, the fixed blade holder 23 can be mounted on a relatively small anvil 10, thereby reducing the size of the overall structure and reducing the cost of manufacture.

The jack 24 disposed at the end of the fixed blade holder 23 reduces the dimensions of the anvil 10, and in turn, reduces the cost of manufacture.

According to some embodiments of this application, this application further provides a cutting device. The cutting device includes the fixed blade monitoring structure 100 applied to a cutting device of a lithium battery electrode plate according to any one of the foregoing solutions.

According to some embodiments of this application, referring to FIG. 2 to FIG. 6, this application provides a fixed blade monitoring structure applied to a cutting device of a lithium battery electrode plate. The fixed blade monitoring structure includes an anvil 10 containing a sliding sleeve 11, a fixed blade die set 20 containing a fixed blade holder 23 and a fixed blade 21, and a fixed blade monitoring assembly. The fixed blade 21 is mounted in the fixed blade holder 23, and the fixed blade and the movable blade 22 are in up-and-down correspondence and arranged in a staggered manner. The fixed blade monitoring assembly is disposed in the sliding sleeve 11, and one end of the fixed blade monitoring assembly abuts on a flank of the sliding sleeve 11, and the other end abuts on the holder. During the operation of the cutting device, a relative force exists between the fixed blade 21 and movable blade 22. The relative force is transmitted to the fixed blade holder 23. The fixed blade monitoring assembly detects the relative force on the end of the fixed blade holder 23 and renders the relative force in the form of data. The data can be used as a reference for adjustment and test, thereby implementing parameterized adjustment and test of the cutting device, shortening the mounting and tuning period, monitoring the status of the movable blade 22 during the cutting, and facilitating timely adjustment of the relative status of the movable blade 22 and the fixed blade 21.

Finally, it needs to be noted that the foregoing embodiments are merely intended for describing the technical solutions of this application other than limiting this application. Although this application is described in detail with reference to the foregoing embodiments, persons of ordinary skill in the art understand that they may still make modifications to the technical solutions described in the foregoing embodiments or make equivalent replacements to some or all technical features thereof, without departing from the scope of the technical solutions of the embodiments of this application.

What is claimed is:

1. A fixed blade monitoring structure applied to an electrode plate cutting device, the fixed blade monitoring structure comprising:
   an anvil, wherein a sliding sleeve is disposed on the anvil;
   a fixed blade die set, comprising a fixed blade holder and a fixed blade mounted on the fixed blade holder, wherein the fixed blade holder is slidably mounted in the sliding sleeve; and
   a fixed blade monitoring assembly, mounted in the sliding sleeve and connected to the fixed blade holder, and configured to render status of the fixed blade by monitoring a relative force received by the fixed blade holder, wherein the fixed blade monitoring assembly comprises:
     a pressure sensor, one end of the pressure sensor abuts on a flank of the sliding sleeve, and the other end abuts on the fixed blade holder; and
     an elastic adjustment portion disposed on an opposite side of the pressure sensor and is configured to elastically connect the fixed blade holder and the anvil, so as to adjust a position of the fixed blade holder in a horizontal direction of the sliding sleeve.

2. The fixed blade monitoring structure according to claim 1, wherein the elastic adjustment portion comprises a connecting portion and an elastic piece, the connecting portion is parallel to a sliding direction, one end of the connecting portion is threadedly connected to an end of the fixed blade holder, and the other end is elastically connected to the anvil by the elastic piece.

3. The fixed blade monitoring structure according to claim 2, wherein the elastic piece is a compression spring or a compression disc spring, the compression spring or the compression disc spring sheathes the connecting portion, one end thereof abuts on the anvil, and the other end is connected to an end of the connecting portion.

4. The fixed blade monitoring structure according to claim 2, wherein a first mounting hole in communication with the sliding sleeve is made on the anvil, a second mounting hole is made at the end of the fixed blade holder, and one end of the connecting portion passes through the first mounting hole and is threadedly connected to the second mounting hole.

5. The fixed blade monitoring structure according to claim 4, wherein the connecting portion is a bolt, and a head of the bolt abuts on the compression spring or the compression disc spring.

6. The fixed blade monitoring structure according to claim 1, wherein the fixed blade monitoring structure further comprises a controller and a display, and the controller is electrically connected to the pressure sensor and the display separately.

7. The fixed blade monitoring structure according to claim 1, wherein a jack is disposed at an end of the fixed blade holder, and the jack is set in the sliding sleeve.

8. A cutting device, comprising the fixed blade monitoring structure according to claim 1.

* * * * *